(12) United States Patent
Ranki et al.

(10) Patent No.: US 8,165,850 B2
(45) Date of Patent: Apr. 24, 2012

(54) DETERMINING THE DIRECTION OF A SIGNAL SOURCE

(75) Inventors: Ville Valtteri Ranki, Espoo (FI); Antti Paavo Tapani Kainulainen, Espoo (FI)

(73) Assignee: Nokia Corporation, Espoo (FI)

( * ) Notice: Subject to any disclaimer, the term of this patent is extended or adjusted under 35 U.S.C. 154(b) by 639 days.

(21) Appl. No.: 12/338,323

(22) Filed: Dec. 18, 2008

(65) Prior Publication Data

US 2010/0161286 A1 Jun. 24, 2010

(51) Int. Cl.
*H03F 1/26* (2006.01)

(52) U.S. Cl. ............ 702/199; 702/92; 702/94; 702/121; 702/182

(58) Field of Classification Search .......... 702/92, 702/94, 121, 182, 199; 455/39, 129, 107, 455/562.1; 375/315
See application file for complete search history.

(56) References Cited

U.S. PATENT DOCUMENTS

| 3,366,951 A * | 1/1968 | Lhermitte et al. .......... 342/26 D |
| 5,752,167 A * | 5/1998 | Kitayoshi .................. 455/67.11 |
| 2010/0298015 A1 * | 11/2010 | Medbo et al. ................ 455/501 |

* cited by examiner

*Primary Examiner* — Mohamed Charioui
*Assistant Examiner* — Elias Desta
(74) *Attorney, Agent, or Firm* — Locke Lord LLP

(57) ABSTRACT

A system for measuring signals received by an apparatus. An antenna system in the apparatus may include two or more antennas. A receiver in the apparatus may be configured to measure signal response induced in the antenna system in accordance with a pattern. After the signal response for the antenna system is measured at least once, the pattern may be altered and the signal response for the antenna system may be measured again in accordance with the altered pattern. The signal response in the antenna system measured for the pattern may then be averaged with the signal response in the antenna system measured for the altered pattern, and the average may be utilized as input to, for example, a directional determination process.

26 Claims, 12 Drawing Sheets

DETERMINING THE DIRECTION OF A SIGNAL SOURCE

BACKGROUND

1. Field of Invention

Various embodiments of the present invention pertain to directional functionality in apparatuses, and in particular, to the processing of signals received in multi-antenna systems.

2. Background

Support for wireless communication (e.g., apparatuses, resources, carrier range, etc.) continues to expand worldwide. This growth has not been limited only to technologically advanced users, but has also been evident in a user base having limited skills, resources, etc. In particular, the same interest in services that, in addition to traditional voice functionality, may now provide Internet access, location and/or positioning, multimedia content, email, messaging and other types of wireless interaction to upper echelon users living in large metropolitan areas now also exists in lower class users, and in areas where wireless service has introduced a new ability to communicate where no widespread landline infrastructure was previously feasible due to, for example, implementation cost, terrain and technological obstacles, unskilled users, etc.

As a result, substantial focus is now being given to the growing market segment of users that have limited technological ability, financial resources, access to infrastructure, etc. The challenges presented therein extend beyond simply providing apparatuses and corresponding support systems that encompass a wide array of functionality as it might be, for example, in large metropolitan areas where knowledge and resources are abundant. In addition to just providing different types of functionality, such as direction-related functionality, apparatuses and support systems must be able to operate where resources are scarce. For example, apparatus designs may be less complex (e.g., using fewer components) in order to keep cost manageable for low income consumers, while providing features similar to some of those found in more powerful devices.

Implementing more advanced functionality in low-end apparatuses often requires doing "more with less." For example, direction-related functionality implemented in a low-end device may be required to operate using fewer hardware and/or software resources. As a result, challenges that do not exist in more complex multifunction apparatuses may be introduced when trying to replicate similar functionality using limited hardware and/or software resources.

SUMMARY

Various embodiments of the present invention are directed to at least a method, apparatus, computer program product and system configured to measure signals received by an apparatus. An antenna system in the apparatus may include two or more antennas. A receiver in the apparatus may be configured to measure signal response induced in the antenna system in accordance with a pattern. After the signal response for the antenna system is measured at least once, the pattern may be altered and the signal response for the antenna system may be measured again in accordance with the altered pattern. The signal response in the antenna system measured for the pattern may then be averaged with the signal response in the antenna system measured for the altered pattern, and the average may be utilized as input to other systems in the apparatus that require the signal information, for example, a directional determination process.

In accordance with at least one example implementation of the present invention, the apparatus may include one receiver configured to measure the signal response in the two or more antennas in a time-multiplexed manner. The receiver may measure the signal response in some or all of the two or more antennas in accordance with an order established by the pattern. The pattern may define an order in various configurations. For example, the pattern may cause the receiver to measure the signal response from all of the two or more antennas sequentially. In another configuration, the pattern may measure the signal response in some or all of the two or more antennas in comprising a sequence of looping subsets. Furthermore, altering the pattern may include changing the order defined in the pattern such as, for example, reversing the order. The signal response for antenna system (e.g., the two or more antennas previously identified in the pattern) may then be measured in accordance with the order set forth in the altered pattern.

The measured signal responses may then be averaged. In accordance with various embodiments of the present invention, the signal response for each antenna that was measured in accordance with the pattern may be averaged with the signal response measured for the same antenna in accordance with the altered pattern. The resulting average signal response for each antenna may then be utilized for directional determination in the apparatus. In accordance with various example embodiments of the present invention, the antennas may be weighted in view of the corresponding average signal response. The direction corresponding to the antennas having the highest weight may then be deemed the direction from which the signal was received.

The above summarized configurations or operations of various embodiments of the present invention have been provided merely for the sake of explanation, and therefore, are not intended to be limiting. Moreover, inventive elements associated herein with a particular example embodiment of the present invention can be used interchangeably with other example embodiments depending, for example, on the manner in which an embodiment is implemented.

DESCRIPTION OF DRAWINGS

Various example embodiments of the present invention may be understood from the following detailed description and example implementations taken in conjunction with the appended drawings, wherein.

DESCRIPTION OF EXAMPLE EMBODIMENTS

While the present invention has been described below embodied in terms of two or more implementation examples, various changes can be made therein without departing from the spirit and scope of the invention, as described in the appended claims.

I. Interaction Scenario

Figure 1A:
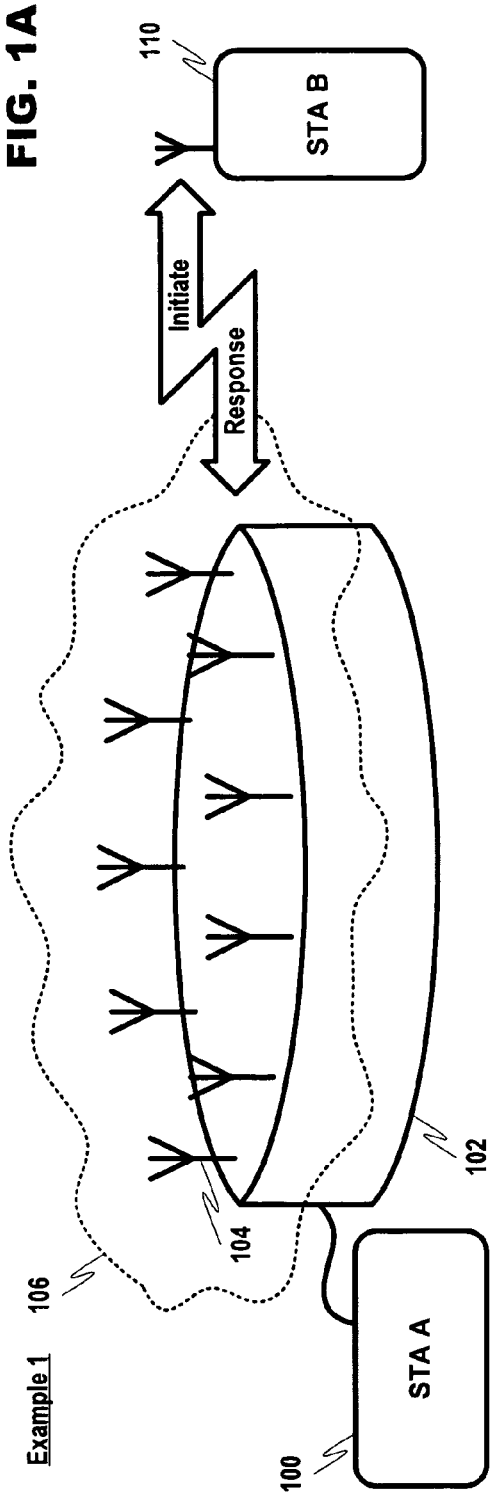
FIG. 1A discloses examples of apparatuses interacting via wireless communication in accordance with various embodiments of the present invention.
Figure 1A:
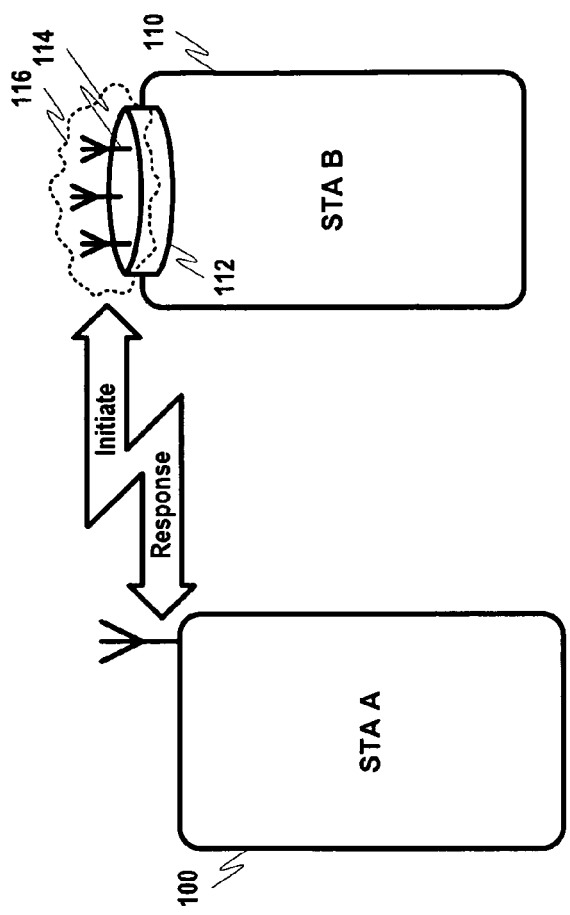

FIG. 1A discloses two examples apparatus interaction that will be utilized herein to explain various example implementations of the present invention. While station A (STA A) 100 and station B (STA B) 110 have been disclosed in FIG. 1A, the different embodiments of the present invention are not specifically limited to this scenario, and may also be used in situations where a larger number of apparatuses are interacting, the apparatuses are situated further away from each other, the apparatuses are configured to act in different roles, etc. For example, apparatuses may temporarily assume roles of access point (AP) and/or station (STA) in ad-hoc network environments where the roles of the participating apparatuses are constantly changing.

Example 1 of FIG. 1A discloses STA A 100 acting as an access point to which STA B 110 will connect. At least STA A 100 includes an antenna array 102 comprising multiple antennas 104 capable of transmitting and receiving signals 106. Further, antenna array 102 may be able to determine the direction from which received signals arrive, and further, to transmit directional signals. On the other hand, STA B 110 may not include any functionality supporting direction determination (e.g., may be a "common" wireless communication device). While the antenna system of STA A 100 has been shown as separate from the apparatus, this representation has been used merely to more clearly describe the various embodiments of the present invention. In example 1, the disclosed wireless interaction is initiated by the at least one station that can provide directional functionality, and thus, all directional determination occurs in this station.

However, the various embodiments of the present invention are not limited only to this application. Example 2 discloses an alternative scenario wherein STA A 100 is and apparatus that can communicate wirelessly but includes no signal-related directional abilities, while STA B 110 incorporates directional functionality. In particular antenna system 112 may comprise antennas 114 that send and receive signals 116. Antenna system 112 may be, for example, designed for high frequency domain operation (e.g., 60 GHz band) can utilize a smaller-sized antenna arrays, and thus, may be implemented in a more compact area (e.g., in an integrated circuit or chipset that can be incorporated in an apparatus). As opposed to the above, the initiating apparatus, STA A 100, does not include any directional functionality, and therefore, all of the directional determination in this interaction is performed by the responding apparatus.

The number of antennas in an antenna system may depend on various factors such as apparatus characteristics, planned usage environment, directional accuracy requirements, etc. For example, restrictions in apparatus size, power, processing, etc. may dictate the size of an antenna system supportable by an apparatus. Some or all of antennas 104 and 114 in antenna systems 102 and 112 may be active at any given time, which may result in communication signals, represented for example in FIG. 1A at 106 and 116, being transmitted or received. While, the example of FIG. 1 discloses signals 106 and 116 as multidirectional, antenna systems may also be implemented with, for example, a switched set of directional fixed-beam antennas configured to transmit and receive directional signals for use in data communication, location determination, etc. Moreover, while example 1 and example 2 describe two apparatuses wherein only one of which incorporates directional functionality, it is also possible to utilize the various embodiments of the present invention in situations where both devices are enabled to determine the direction from which a received signal was received (e.g., direction towards the source).

Figure 1B:
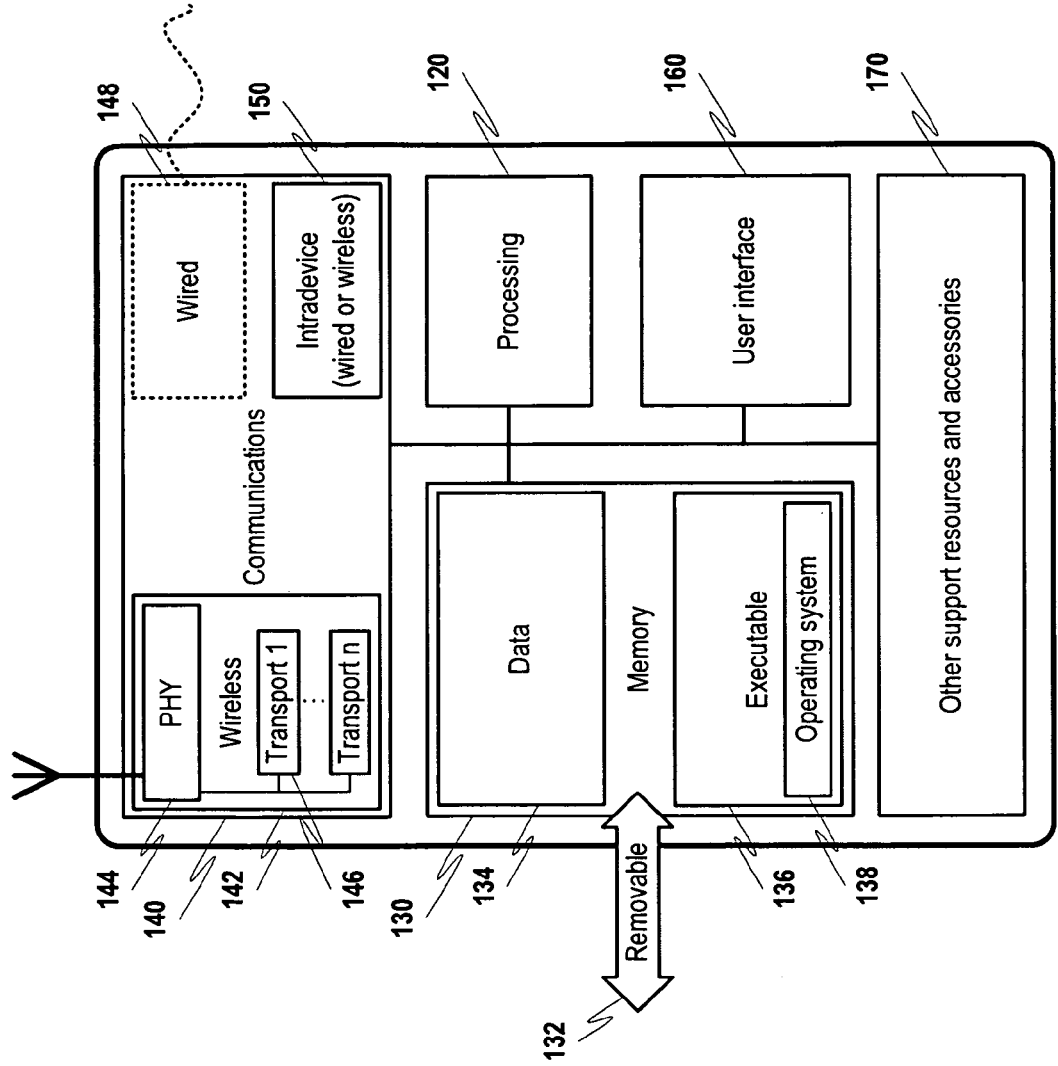
FIG. 1B discloses an example of a functional layout for the apparatuses previously described with respect to FIG. 1A.

Now referring to FIG. 1B, an example device configuration in accordance with at least one embodiment of the present invention is disclosed. For instance, the basic layout disclosed in FIG. 1B may be applied to one or both of the example apparatuses disclosed in FIG. 1A. Processing section 120 may comprise one or more components responsible for processing data such as microprocessors, microcontrollers, discrete logic circuits, field-programmable gate arrays (FPGA), etc. Processing section 120 may be configured to perform various apparatus activities including operations utilizing input data, yielding output data, triggering actions in the apparatus, etc. These operations may include, but are not limited to, arithmetic manipulation, conversion, compilation, interpretation, etc. Information used in, and subsequently created by, the aforementioned activities may be stored in memory 130, which may communicate with processing section 120 via wired or wireless a communication bus.

Memory section 130 may incorporate various types of static or dynamic memory. For example, read-only-memory (ROM) and random access memory (RAM) may be constituted of elements taken from an array of technologies such as magnetic, optical and electronic memory mediums. The memory elements that make up memory section 130 may further be fixed within the apparatus or may be removable (e.g., as shown at 132). Removable media 132 may include floppy disks, hard drives, CD, DVD, flash devices, etc., and may be utilized for storing, loading, transferring or backing-up various types of information. Types of information that may be stored in memory 130 include at least data 134 and executable 136. Data 134 may include raw information or organized data in the form of, for example, databases, text, audio and/or video (e.g., multimedia), etc. Processing section 120 may utilize executable information 136 for apparatus activities, such as operations using data 134. For instance, operating system 138 may include one or more executable programs configured to provide baseline apparatus operation.

Processing section 120 may utilize information stored in memory section 130 when interacting with communications section 140. Communications section 140 may comprise resources for supporting at least wireless 144 and intra-device 150 communication. Support for wireless communication 140 may allow one or more wireless transports 142 to access physical layer (PHY) 144, which may include antenna systems along with corresponding hardware and/or software used when communicating wirelessly with other apparatuses. Intra-device support 150 may include wired and/or wireless resources for conveying data internally amongst the apparatus subsystems. Communications 140 may optionally include support for other communication medium, such as wired communication 148. Wired support 148 may comprise any hardware (e.g., connector) and/or software required for connecting to a wired communication medium.

Example apparatuses that may be utilized in various embodiments of the present invention may further include user interface functionality 160, as well as other support resources and accessories section 170. The inclusion of optional sections may depend on various factors such as apparatus capability and configuration options, uses for which apparatuses are intended, etc. If configured to act as an AP, STA A 100 may not require extensive user interface features, but may include other functionality such as battery backup, enhanced wireless security, etc. On the contrary, STA A 100 may incorporate comprehensive user interface features (e.g., displays, keypads, speakers, pointing devices, microphones, etc.) as well as resources related to desired user functionality when tasked as a portable communication device (e.g., multifunction handset).

II. Antenna Systems

Figure 1C:
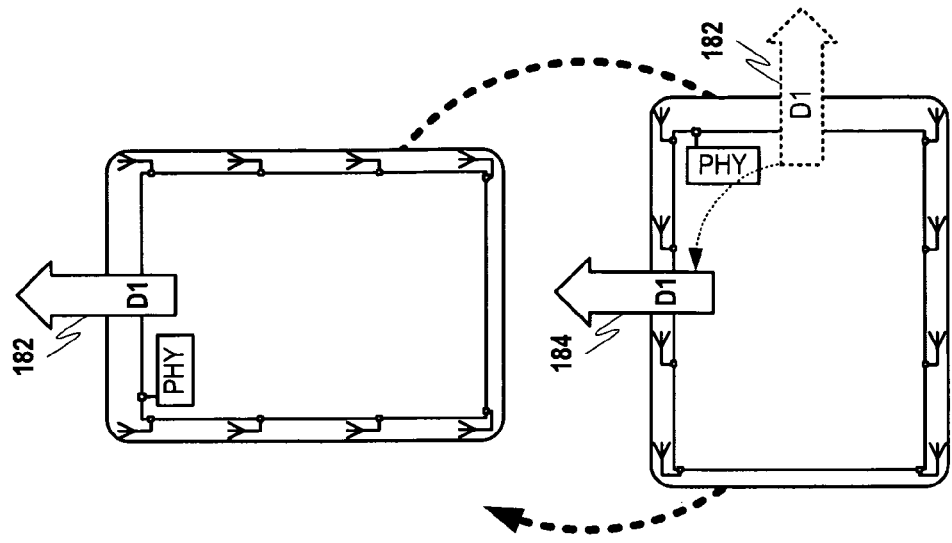
FIG. 1C discloses an example of a functional layout corresponding to the apparatuses previously described in FIG. 1A, further including an example antenna array system.
Figure 1C:
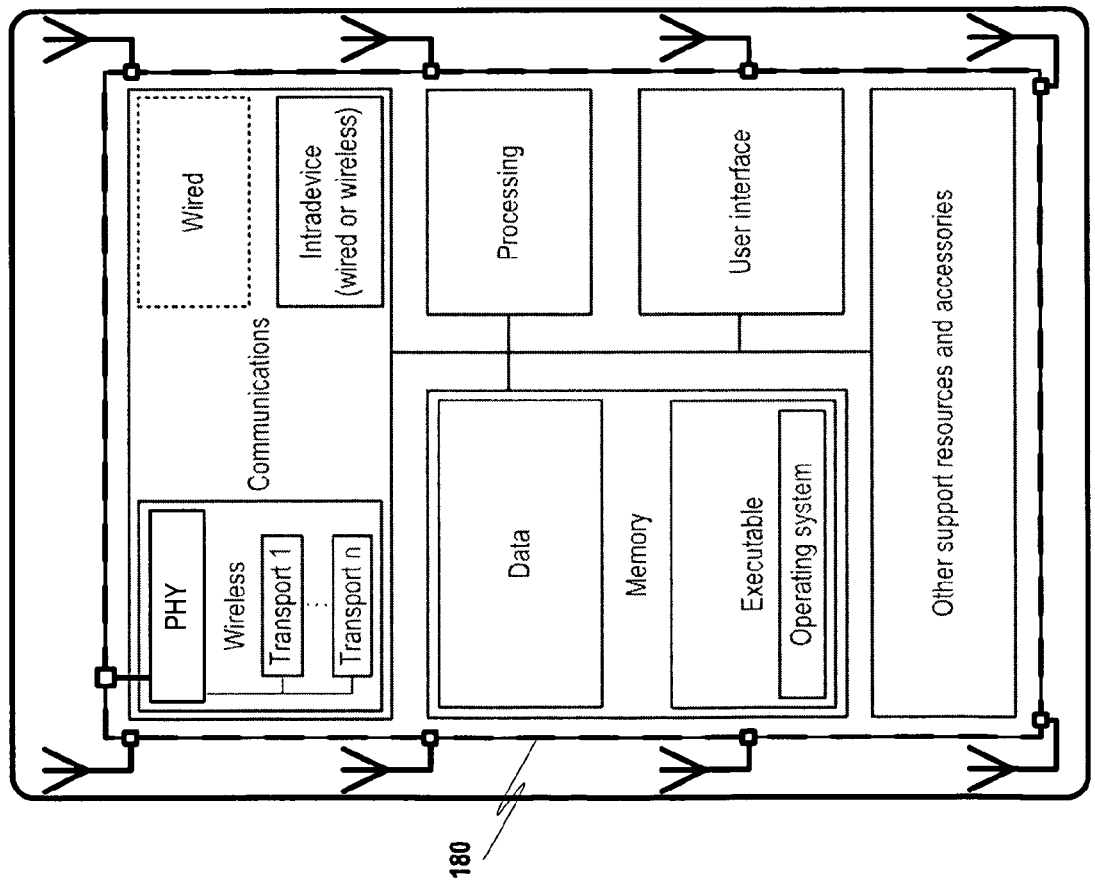

Antenna systems may range from a single antenna (and the corresponding support hardware and/or software) to complex multi-antenna arrays. This principle is illustrated in FIG. 1C wherein an example multi-antenna system 180 is applied to the functional layout of FIG. 1B. While multi-antenna system 180 comprises a plurality of antennas that are arranged around the periphery of the apparatus, various implementations of the present invention are not limited only to this configuration. FIG. 1C merely demonstrates a possible antenna incorporation scenario. Furthermore, an operational example of an apparatus that may execute different functionality, based on orientation, position, or a similar physical property, is also disclosed. Arrows 182 and 184 demonstrate that, regardless of apparatus orientation, the actual direction of D1 may be maintained. In particular, sensed changes in the physical disposition of the device may trigger the recalibration of the antenna array to change the relative position of D1 from 182 to 184.

The implementation of an antenna system on an apparatus may depend on various factors including, but not limited to, the capabilities of an apparatus, uses for which apparatuses are intended, etc. Now referring to FIG. 2, an example antenna system is disclosed. Antenna system 200 includes multiple individual antennas 104 organized in an antenna array. Some of antennas 104 have been removed (e.g., as shown at 202) in order to provide clarity in the figure. In addition, while antenna system 200 has been shown in a circular configuration, the geometric arrangement of antennas 104 in multi-antenna systems may depend on whether the array will be incorporated into an apparatus, the dimensions of the apparatus, the required (or desired) sensitivity of the antenna system, etc.

For each antenna 104 and 202 there may be a corresponding receiver (RCV) 204 in example antenna system 200. Each receiver 204 may be configured to measure the response of a corresponding antenna 104 and 202 to received signals. The measured signal response may then be provided to analysis module 206. Analysis module 206 may comprise hardware and/or software for analyzing signal information. The result of the analysis may be, for example, a directional quantity, such as an estimation of the direction from which the signal was received. This information may be used for various direction-related applications such as locating the source of the signal, direction finding, etc. Since example antenna array 200 includes one receiver 204 for every antenna 104 and 202, measuring signal response for some or all of antennas 104 and 202 may be done relatively simultaneously. Measuring signal response in this manner may result in faster, and possibly more accurate, outputs from analysis module 206.

Figure 3:
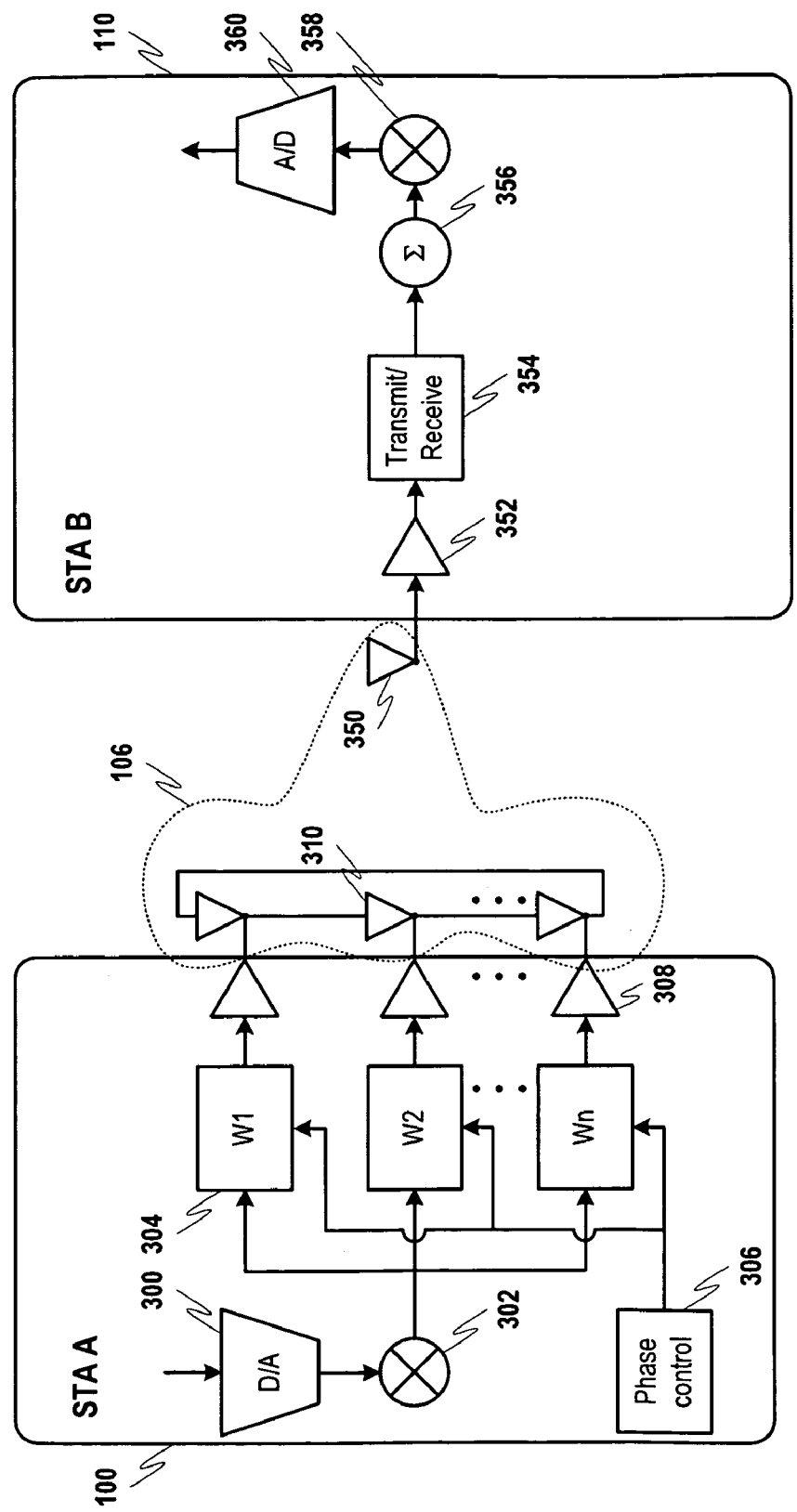
FIG. 3 discloses an example interaction of apparatuses including at least one configurable antenna system corresponding to the example of FIG. 2.

A detailed operational example of an antenna system including multiple antennas and corresponding receivers is disclosed in FIG. 3. Digital information for transmission in STA A 100 may be converted to analog signal information in digital to analog converter (D/A) 300. Analog signal information from D/A 300 may then be combined into an analog transmission signal in summing element 302. When employing directional communication (e.g., array beamforming), the phase of the feed input signals to each antenna element in the transmitter may be controlled using predefined weight vector w (as shown at 304). Phase controls 306 may then adjust gain vectors 304 before each phase-tuned antenna input signal is amplified (e.g., as shown at 308). As a result, the individual signals emitted from each antenna element 310 may be combined through constructive interference to form a directional transmission signal (e.g., also referred to as beam forming). Communication beams may have gains maximized in a direction corresponding to a target apparatus, such as devices with which a communication link using directional transmission and reception is desired. Alternatively, the antenna system may be configured to operate using omnidirectional signals if, for example, the actual position of the target apparatus is unknown.

Analog signals sent from antenna elements 310 may then be received by antenna element 350. STA B 110, as shown in FIG. 3, is a single antenna apparatus without directional capabilities. STA B 110 may be, for example, a common wireless communication device like a cellular handset. Signals received by the antenna may be processed by transmission/reception component 354 and combined by summing elements 356 and/or 358. The resulting signal may then be converted back into digital information by analog to digital converter (A/D) 352.

Using the example system, or similar systems, the transmission energy may be focused to line of sight or stronger reflection paths, whereas, other multipaths become attenuated. The set of beamforming vectors used may depend on antenna system geometry, such as linear, circular or planar, as well as the desired beam direction. Phased arrays may also include beamforming control resources configured to steer beams from a set of multiple fixed beams. Further, while the example shown in FIG. 3 includes an apparatus that is capable of performing directional operation (e.g., determination, transmission and reception) communicating with an apparatus that does not include the same functionality, embodiments of the present invention are not limited to this scenario. The capabilities of these apparatuses may switched (e.g., as shown in the example of FIG. 4B), all participating apparatuses may have directional functionality, etc.

III. Example Reduced-Complexity Antenna System

Figure 2:
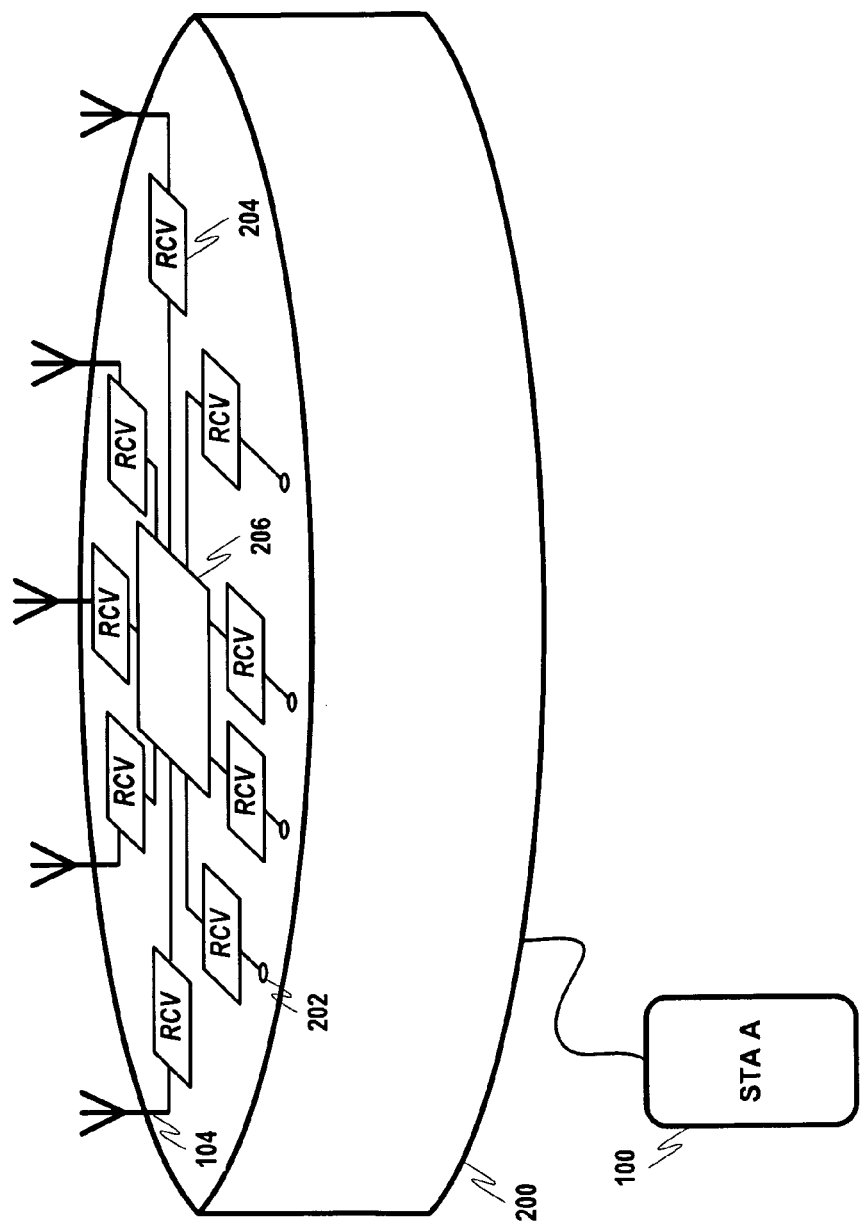
FIG. 2 discloses an example configuration of an antenna system in accordance with at least one embodiment of the present invention.

Some situations may not be appropriate for example antenna configurations such as disclosed in FIG. 2. More specifically, implementing designs similar to antenna system 200 in apparatuses having limited size, processing capability, power, etc., as well as in apparatuses that have been targeted for certain markets (e.g., low cost handsets), may not be feasible or practical.

Figure 4A:
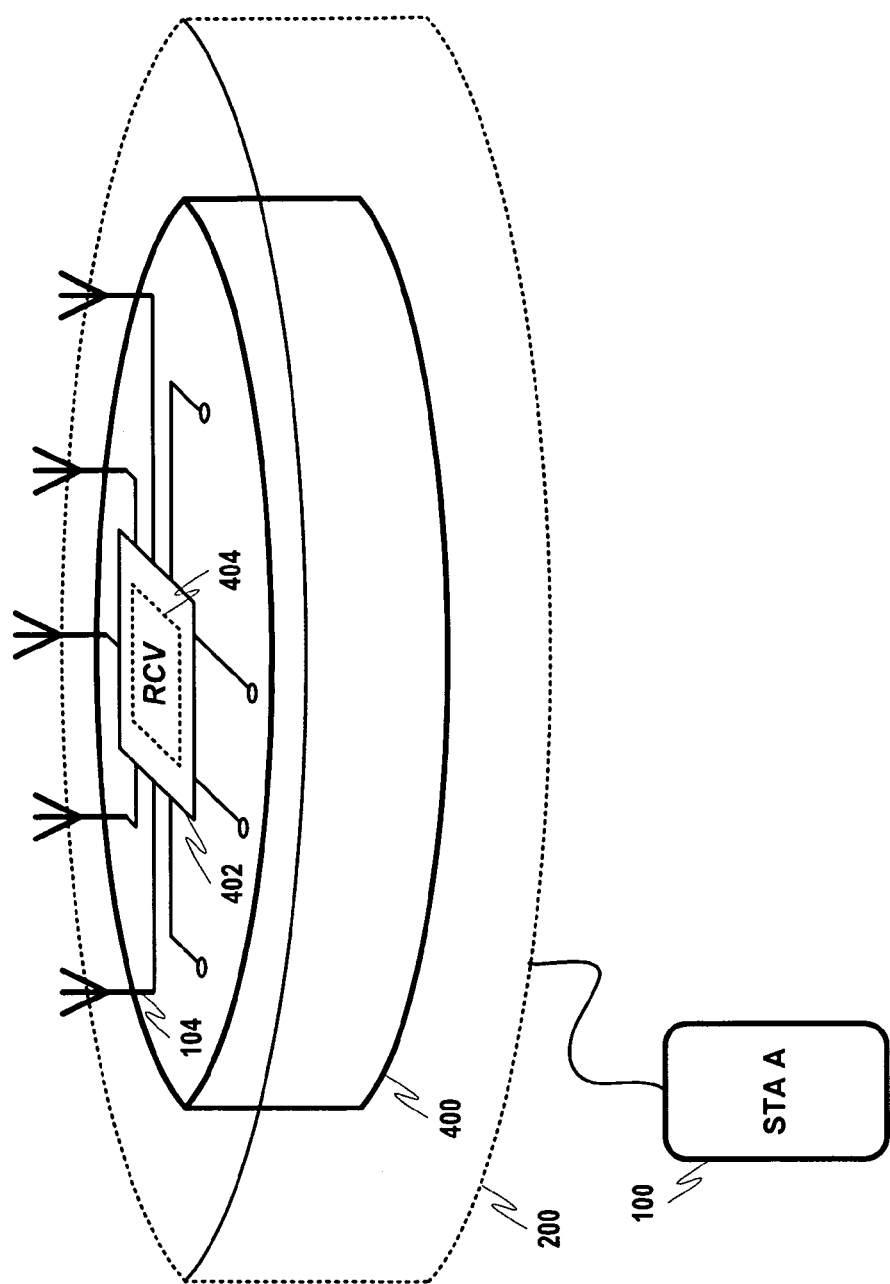
FIG. 4A discloses an example configuration of a simplified antenna system in accordance with at least one embodiment of the present invention.
Figure 4B:
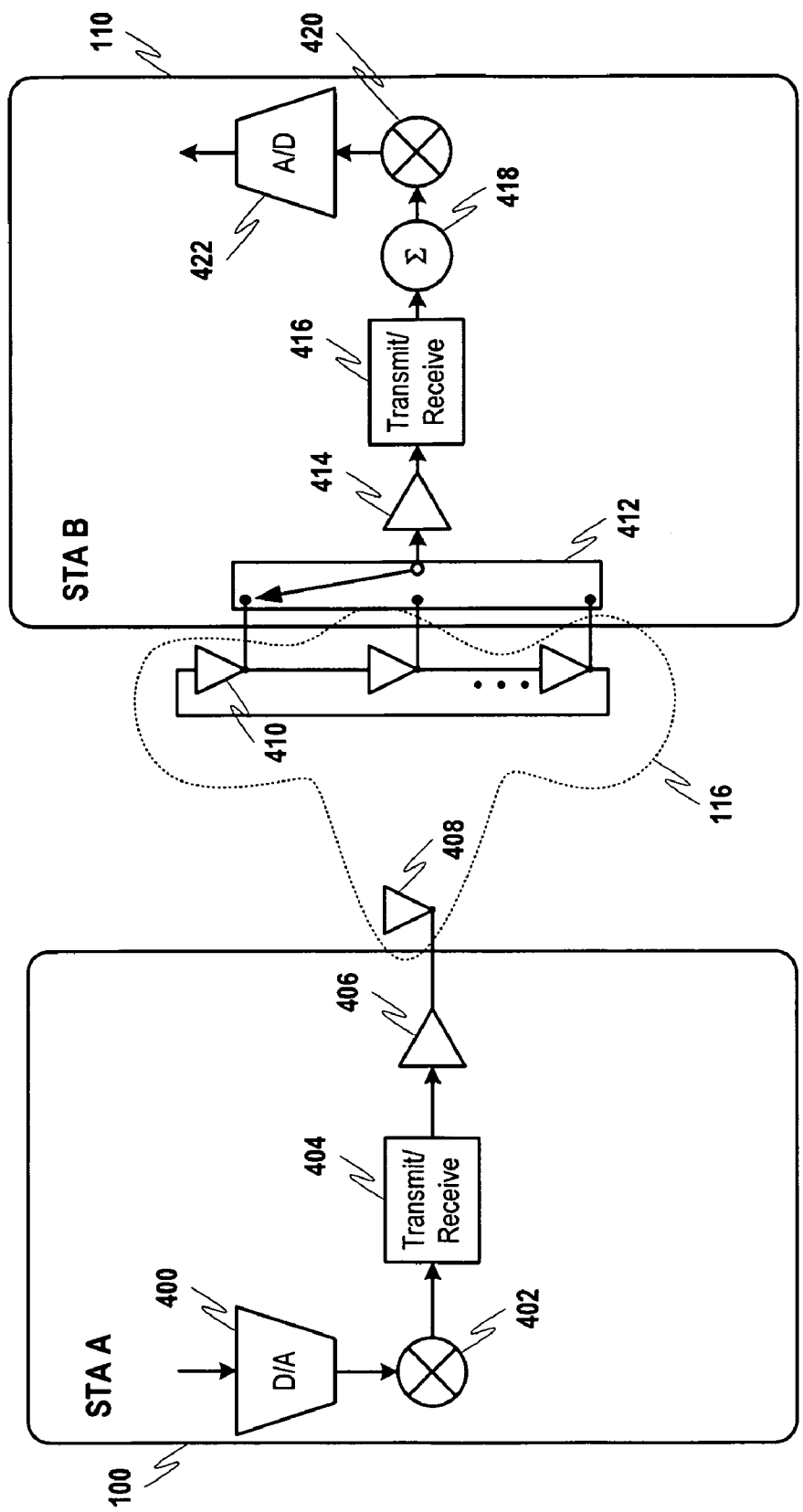
FIG. 4B discloses an example interaction of apparatuses including at least one configurable antenna system corresponding to the example of FIG. 4A.

Regardless of the aforementioned limitations, similar functionality may be offered in apparatuses having resource limitations using alternative configurations such as the example disclosed in FIG. 4A. Antenna system 400 utilizes a single receiver 404 that scans each antenna instead of incorporating a receiver for each antenna. Receiver 404 has been disclosed in FIG. 4A as integrated within analysis module 402. In accordance with at least one example embodiment of the present invention, some or all of the hardware resources corresponding to analysis section 404 may be shared between one or more software-based elements (e.g., receiving and analysis software modules). While the disclosed configuration may be more efficient in terms of power and space usage in STA A 100, it is also possible to implement receiver 404 and analysis module 402 in hardware (e.g., firmware), as standalone components linked by a communication bus, etc.

The example configuration of FIG. 4A reduces the amount of resources needed to support functionality similar to that described with respect to FIG. 2. Possible benefits that may be realized from reduced resource requirements include smaller processing and power overhead, smaller footprint (e.g., demonstrated by the dotted outline of antenna system 200) and lower cost of implementation, which may make antenna system 400 more appropriate for apparatuses where resources are limited. However, obstacles not encountered with the antenna system of FIG. 4A may arise. At least one difficulty may pertain to measuring activities performed by receiver 404.

FIG. 4B discloses a functional diagram in a format that is similar to FIG. 3, but in this instance the diagram corresponds to the example reduced complexity transmission/reception system shown in FIG. 4A. Further, the apparatus enabled with directional functionality in this example is the receiving station (STA B 110). STA A 100 may be any apparatus that is able to communicate via basic wireless communication including, for example, wireless communicators and handsets. Information to be transmitted via wireless communication may be converted from digital to analog by D/A 400. The analog signals may then be combined and prepared for transmission at 402 and 404. After transmission/reception module 403 processes the analog signal, the signal may be amplified at 406 and transmitted by antenna element 408. Since STA A 100 is not enabled for directional operation, the transmitted signal will be omnidirectional.

In STA B 110, signals may be received in the antenna array (e.g., by each antenna element 410). Multiplexer component 412 may receive signal information from each antenna element 410, thereby receiving the signal in a time-multiplexed manner. Multiplexer component 412 may move from antenna to antenna in accordance with control information that defines a particular pattern, a series of repeating patterns, etc. The information from each antenna element 410 may then be fed to amplifier 414, which in turn supplies it to transmission/reception element 416 for processing. The processed signals taken from each antenna element 410 may then be combined by integration and summing elements 418 and 420. The consolidated processed signal that results may then be converted from analog to digital information by A/D 422. In a manner such as described above, STA B 110 may receive a signal from STA A 100, and may utilize this information to determine the direction of arrival of the signal. The directional information may then be utilized to determine a direction towards which directional communication (e.g., a communication beam) intended for STA A 100 should be sent. The example configuration of STA B 110, as shown in FIG. 4B, utilizes the same set of components for processing signals received in each antenna via multiplexing, which reduces the complexity of the system.

Figure 4C:
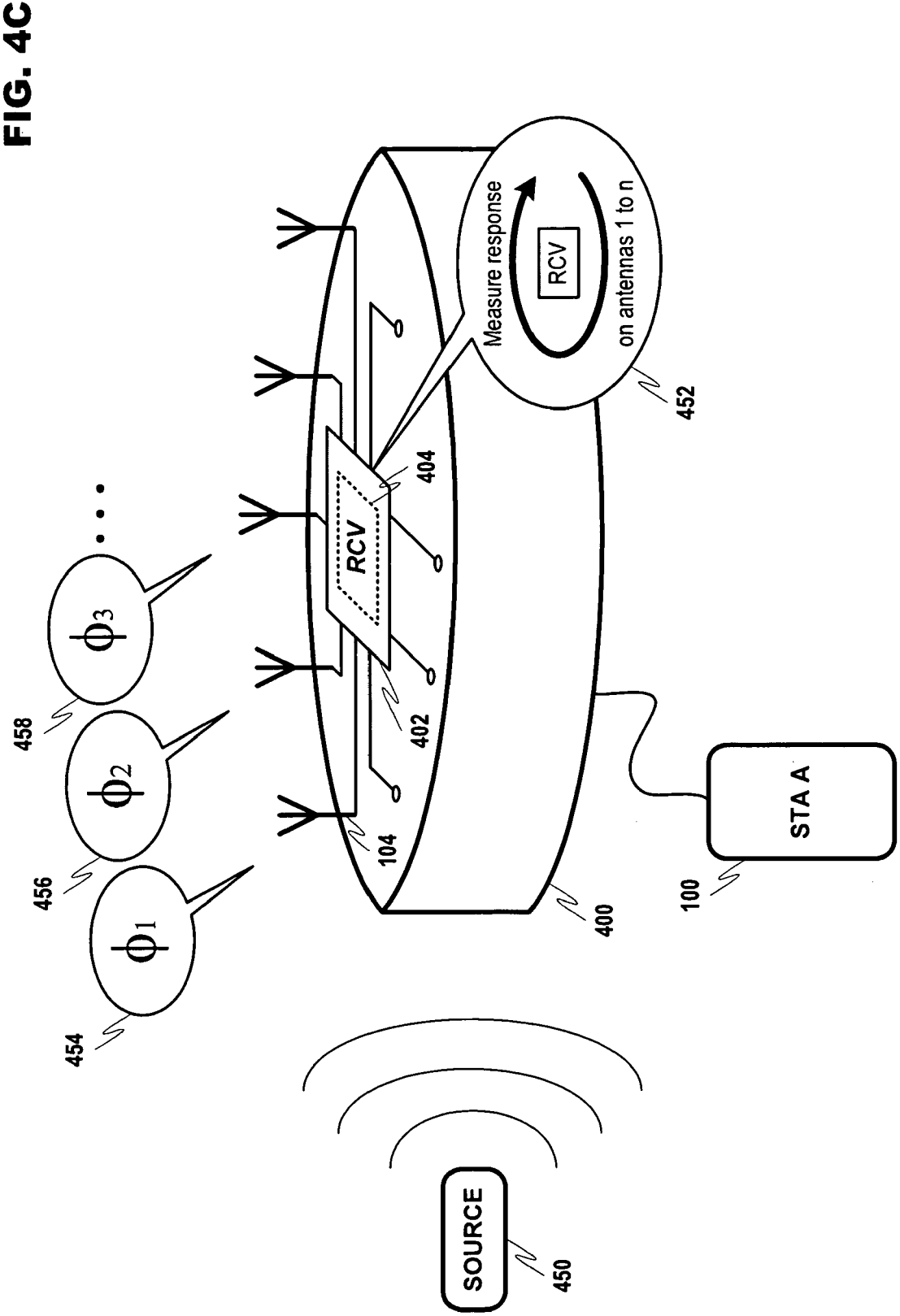
FIG. 4C discloses an example operational scenario for a simplified antenna system in accordance with at least one embodiment of the present invention.

FIG. 4C discloses an example that uses STA A 100 to explain signal response measurement in antenna system 400. An example signal source is shown at 450. When operations requiring signal measurement and processing are activated in STA A 100 (e.g., processes related to directional determination), receiver 404 may scan some or all of antennas 104 (possibly including antennas that have been removed from FIG. 4C to improve clarity). Receiver 404 may then traverse from one antenna 104 to another measuring, for example, the strength of the signal received by each antenna 104 (e.g., signal response) as shown in FIG. 4C at 452. Measurement may proceed in this sequential manner for some or all antennas 104 (e.g., from 1 to n). As only one antenna 104 is measured at any instance in time, the measurement process may be deemed time-multiplexed. The impact of measuring the signal response induced in each antenna 104 in this manner is that the phase of the received signal ($\phi$) will change from antenna to antenna. This phenomena is seen at 454-458 in FIG. 4C, wherein signal responses including at least different phases ($\phi_1$, $\phi_2$, $\phi_3$) are measured. Since data is obtained from the measurements taken at different times, fluctuations in reference clock frequency may be seen as phase errors in the measurements. These perceived phase errors may result in errors arising during sequent signal response analysis. For example, perceived errors in time-multiplexed measurement may reduce the accuracy of direction estimates for directional determination, possibly to the extent that the estimates become completely useless.

IV. Example Compensation for Frequency Fluctuation

In accordance with at least one example embodiment of the present invention, changes in the manner in which an antenna system executes measurements of some or all of the antennas may help to avoid errors created by frequency fluctuation in measured signal response.

Measurements from different antennas are completely relatively quickly. As a result, the frequency of the reference clock doesn't change substantially, but essentially remains constant during the time it takes to do measurements for some or all of the antenna elements. The frequency, however, will still deviate from what is expected causing the phases to rotate steadily with time. This effect may be countered by measuring some or all of antennas 104 in accordance with a first pattern [e.g., 1 2 3 . . . n] followed by an altered version of the pattern [e.g., n . . . 3 2 1] and then averaging the two measurements. A pattern may identify the order in which some or all of the antennas 104 in an antenna system (e.g., antenna system 400) should be measured. Averaging two measurements of an antenna system may involve averaging the signal response measurement for each antenna 104 recorded during the execution of the pattern with the measurement recorded for the same antenna taken during the execution of the altered pattern.

Figure 5:
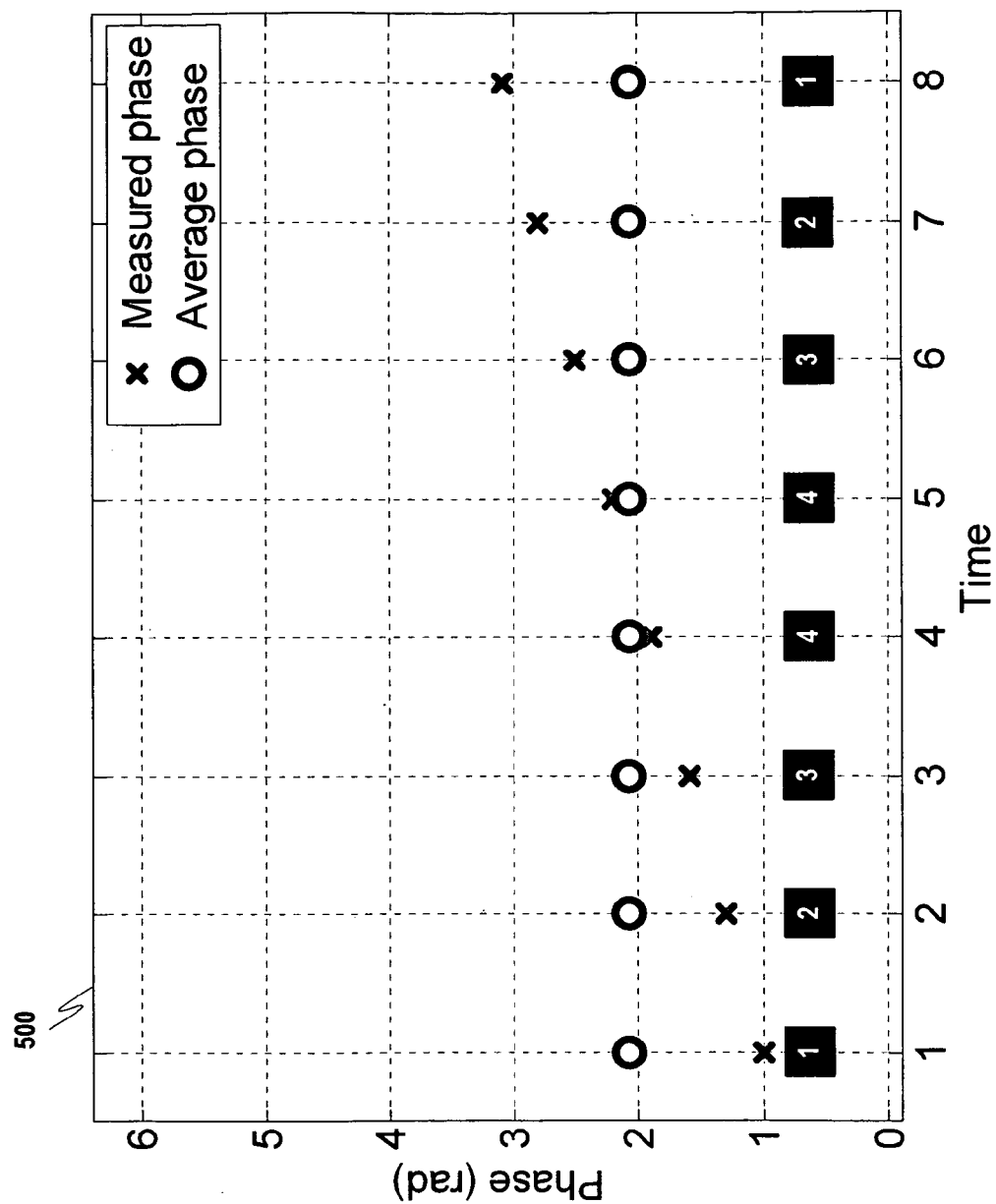
FIG. 5 discloses an example scenario charting the effect of at least one embodiment of the present invention on signal response measurement.

In accordance with various example embodiments of the present invention, measuring some or all of antennas 104 in accordance with a pattern, reversing the pattern (resulting in an "altered" pattern), measuring the same antennas in accordance with the altered pattern, and averaging the two sets of measurements may completely eliminate the constant frequency error. This effect is evident in chart 500 of FIG. 5, wherein time is charted against the phase of the signal response measured in each antenna. The antenna system corresponding to the example of FIG. 5 includes four antennas that are being measured, the order in which these antennas are being measured is shown by the inverted numbers on the bottom of chart 500 (i.e., the white numbers framed in black squares). From time 1-4 the antennas are measured in the order 1-4, which is followed by measuring the antennas in reverse order (i.e., 4-1) during time period 5-8. Averaging measurements "X" results in averages "O" that are phase corrected.

Figure 6:
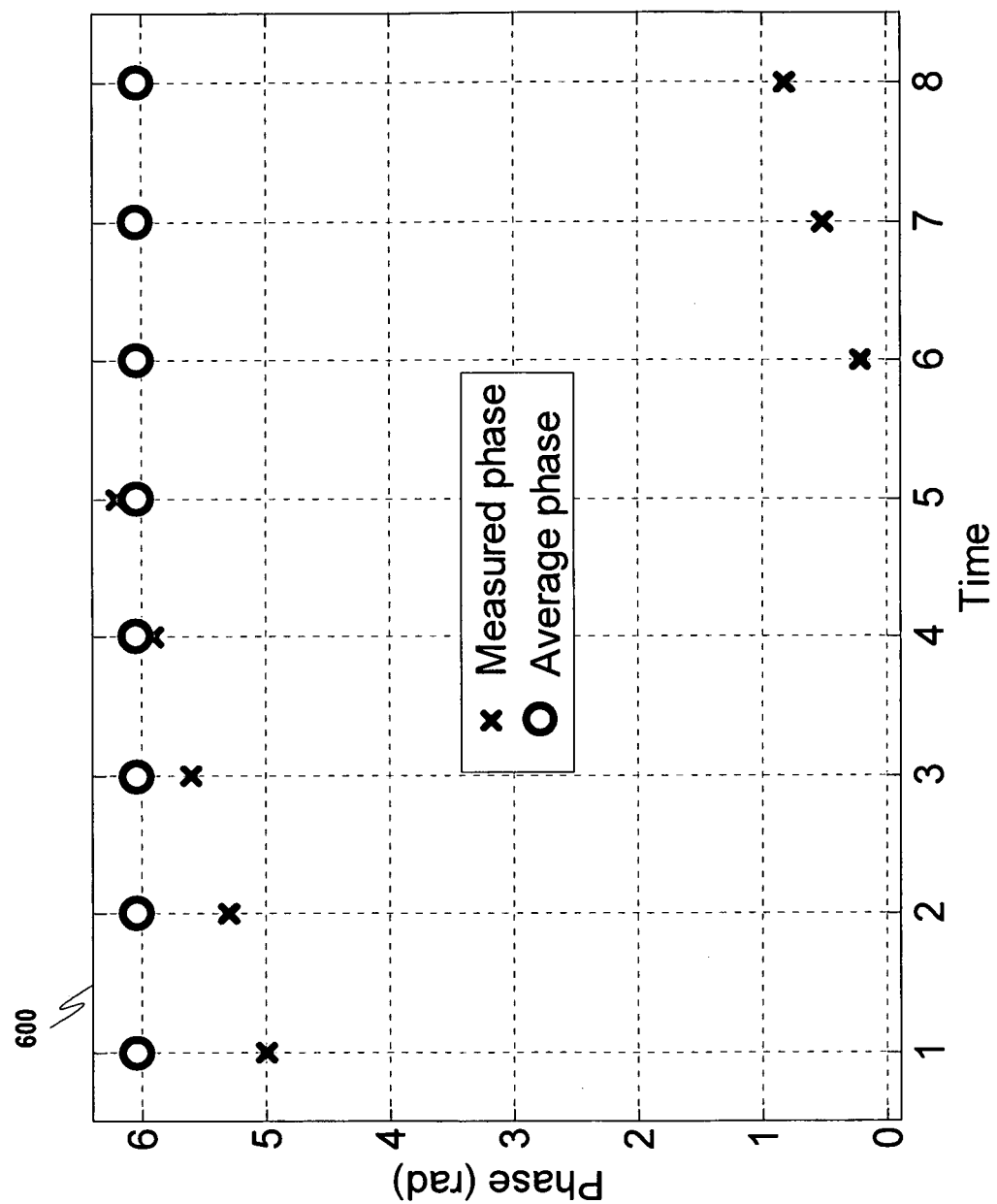
FIG. 6 discloses another example scenario charting the effect of at least one embodiment of the present invention on signal response measurement.

Since phase is periodic, the averaging process may, in accordance with at least one example embodiment of the present invention, take into account situations where the phase jumps. An example of this situation is disclosed in chart 600 in FIG. 6. Assuming a range of [0,2π] for the sake of example, the results may be scaled to π (other scales can be utilized as well): $\phi_1"=\pi$, $\phi_2'=\phi_2-\phi_1+\pi$. After scaling, the range may be checked: $\phi_2"=\text{mod}(\phi_2', 2\pi)$. Calculating the average for this example will then involve: $\phi_{ave}"=(\phi_1"+\phi_2")/2$. The resulting average may then be scaled back: $\phi_{ave}'=\phi_{ave}"+\phi_1-\pi$, which may be followed by an additional range check $\phi_{ave}=\text{mod}(\phi_{ave}', 2\pi)$. Alternatively, vectors or another similar averaging method may be utilized to account for the jumps in the phase experienced due to its periodic nature.

Figure 7:
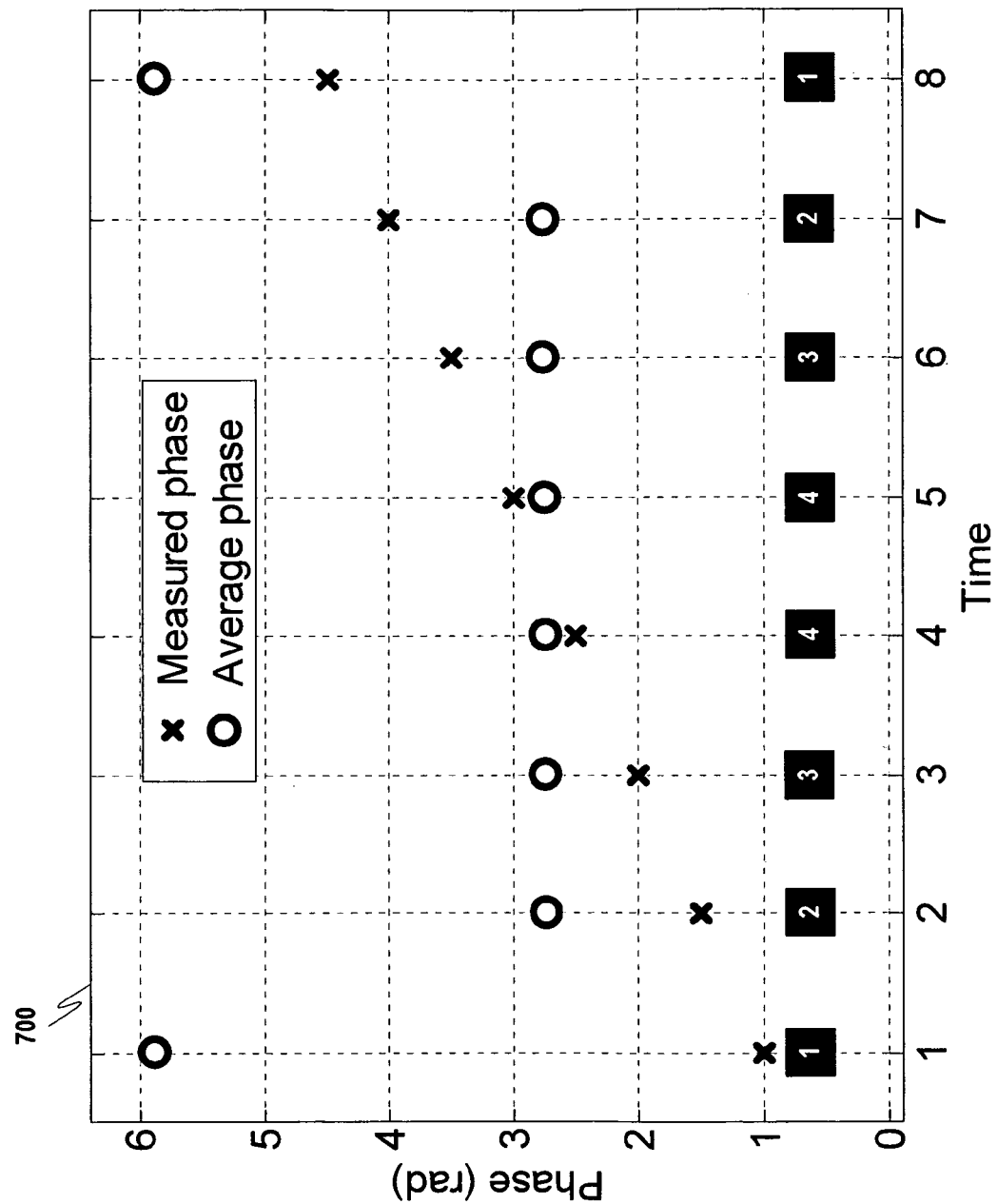
FIG. 7 discloses a third example scenario charting the effect of at least one embodiment of the present invention on signal response measurement.

Frequency errors that are too large may cause large jumps (e.g., 180 degrees) in the averaged phase. This may happen in situations where the phase changes more than 180 degrees during the time period in which it takes to measure the same channel twice (e.g., a first instance in the order set forth by the pattern and then again in the order established by the altered pattern). Since other error sources may also exist, the phase shouldn't be allowed to change the full 180 degrees, but should be limited to some smaller value to avoid these jumps. FIG. 7 discloses the possible result of a situation involving large frequency errors in chart 700.

In view of the above, if the frequency error is substantial, there are many antenna elements to be measured (e.g., resulting in a relatively long time period between measurements) and/or the frequency fluctuations are fast, it may be necessary to do the looping in parts, such as [1, 2, 3 . . . n, followed by n . . . 3, 2, 1; 1, n+1, n+2 . . . n+m, followed by n+m . . . n+2, n+1, 1 . . . ]. An example of a looping subset sequence would be [1, 2, 1; 1, 3, 1; 1, 4, 1 . . . 1, n, 1]. Alternatively, repetition of measuring the same channel sequentially may be omitted resulting in sequence such as [1, 2, 1, 3, 1, 4, 1 . . . 1, n, 1]. For situations where measured signal response is utilized for direction estimation, phase difference may be adjusted to a certain reference phase (e.g., the first antenna/channel measurement could be used as a reference). As a result, a channel may be measured repeatedly for each set (e.g., triangle) of communication channels. Depending on how the direction is estimated, patterns such as [1, 2, 1; 1, 3, 1; 2, 3, 2; 1, 4, 1; 2, 4, 2; 3, 4, 3] may be feasible. That is, phase differences between all antennas may be measured separately.

Figure 8:
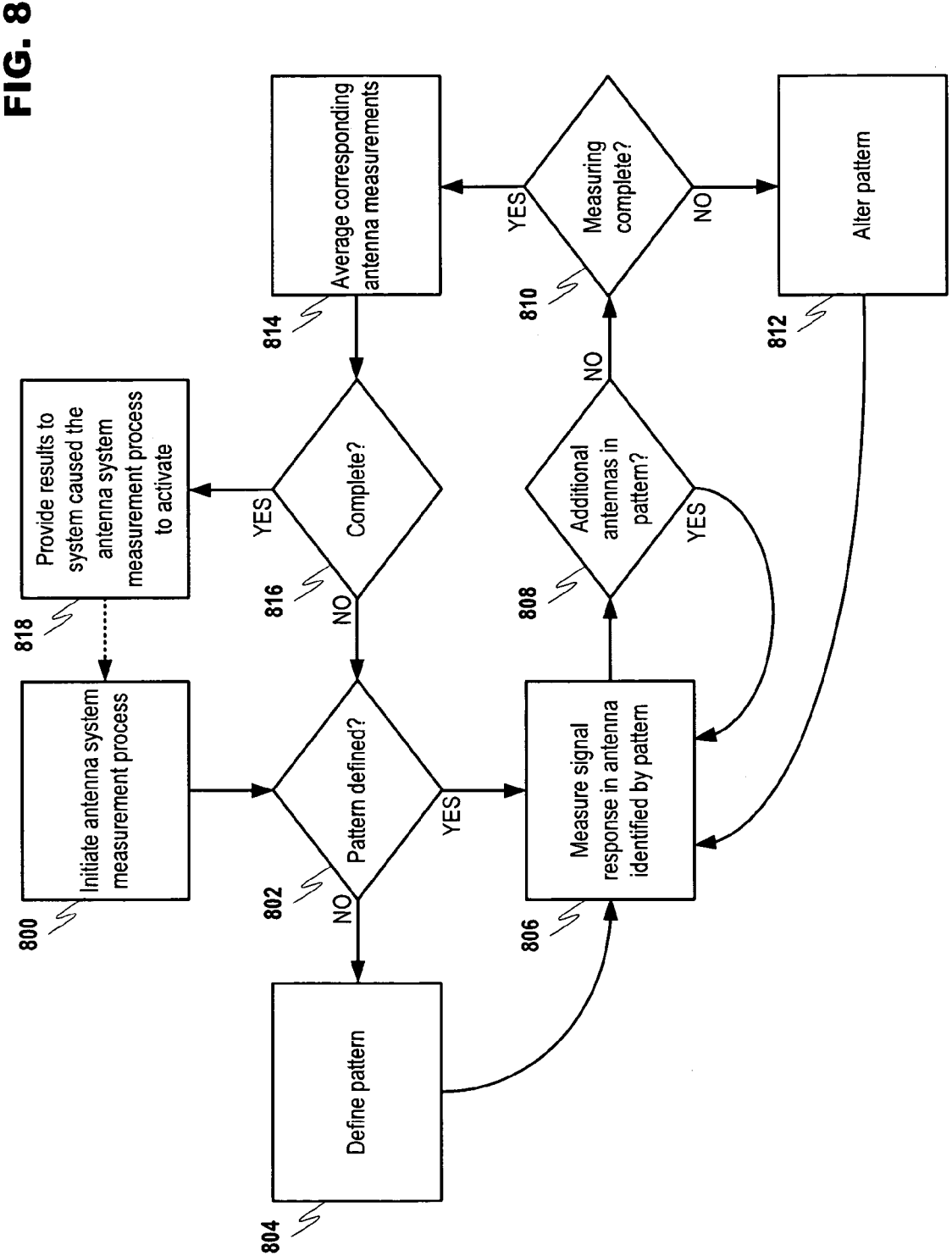
FIG. 8 discloses a flowchart of an example signal response measurement process in accordance with at least one embodiment of the present invention.

Now referring to FIG. 8, a flowchart disclosing an example frequency response measuring process, in accordance with various example embodiments of the present invention, is now disclosed. Antenna system measurement may initiate with step 800. Measurement may be initiated manually (e.g., through user configuration) or automatically. Examples of activities that may automatically initiate the measurement process of FIG. 8 include, for example, calibrating an antenna array, activating a direction-related application on an apparatus such as a directional determination or location program, etc. The process may then proceed to step 802 wherein a determination may be made as to whether a pattern is defined. A pattern may, in accordance with at least one embodiment of the present invention, comprise at least an order for measuring some or all of the antennas in the antenna system. If no pattern is currently defined, a pattern may be defined in step 804. Pattern definition may depend upon, for example, the number of antennas in an antenna system, environmental conditions, the condition of the apparatus in which the antenna system resides, the strength of the signal, the required directional resolution, etc.

Regardless of whether an existing pattern (step 802) or a newly created pattern (step 804) used, the process may proceed to step 806 where the antennas identified in the pattern are measured in a sequence also defined by the pattern. Each antenna may be measured once, or in certain conditions as identified above, the pattern may include looping subsets wherein some antennas may be measured more than once. This process may loop in step 808 until the pattern is completed. A determination may then be made as to whether the measuring process is complete in step 810. Complete, for the sake of the disclosed example, may mean that no further measurements are planned or required before the results are processed. If the measuring process is determined to be incomplete, then the pattern may be altered to create a new pattern in step 812. Altering the pattern may include changing the particular antennas in the antenna system that are being measured and/or the manner in which these antennas are measured. For example, the measurement order for the antennas identified in the pattern may be reversed. The process may then return to step 806 to carry out measurements in accordance with the new pattern.

After all measurement activities are determined to be complete in step 810, the averaging of the measurements in the various measurement patterns may be performed in step 814. For example, the signal response measured for each antenna in the pattern may be averaged with the signal response measured for the same antenna in the altered pattern. As part of this process, or as a separate process, further analysis may occur on the averages such as weighting the antennas that were measured based on the averages. This may indicate, for example, that the antenna having the highest average received the strongest signal. A determination may then be made in step 806 as to whether the process is complete in step 816. If the process is incomplete, such as in the case where additional measurement is required, the process may return to step 802. Otherwise, the process may proceed to step 818 where the results are provided to the system that caused the process to initiate in step 800. For example, the information may be provided for use in a directional determination, such as in a direction of arrival estimation, a location or position determining application, etc. Events in the apparatus may proceed in accordance with the particular tasks being performed therein, however, the process may eventually reinitiate with step 800 (as shown by the dotted line between step 818 and step 800) when requirements in the apparatus trigger the antenna system measurement process to reinitiate.

Accordingly, it will be apparent to persons skilled in the relevant art that various changes in form and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    activating, by an apparatus, a signal measurement operation in the apparatus;
    measuring, by the apparatus, signal response in an antenna system comprising two or more antennas, wherein the signal response is measured in accordance with a pattern;
    after completing at least one measurement of the antenna system, altering, by the apparatus, the pattern;
    measuring, by the apparatus, signal response in the antenna system in accordance with the altered pattern;
    averaging, by the apparatus, the signal response measured for the antenna system in the pattern with the signal response measured for the antenna system in the altered pattern; and providing, by the apparatus, the results of the averaging to another system in the apparatus.

2. The method of claim 1, wherein measuring the signal response in the antenna system comprises measuring the signal response in some or all of the two or more antennas in an order defined by the pattern.

3. The method of claim 2, wherein measuring some or all of the two or more antennas is performed by a receiver in the apparatus configured in accordance with the pattern.

4. The method of claim 1, wherein the pattern depends upon at least one of the strength of the measured signal response, the number of antennas or environmental conditions.

5. The method of claim 1, wherein the pattern comprises at least one of all of the two or more antennas being ordered sequentially, or some or all of the two or more antennas being ordered in at least one sequence of looping subsets.

6. The method of claim 1, wherein altering the pattern comprises reversing the order in which signal response is measured in some or all of the two or more antennas.

7. The method of claim 1, wherein averaging the signal response comprises averaging the antenna response measured for each of the two or more antennas measured in the pattern with the signal response measured for the same antenna in the altered pattern.

8. The method of claim 1, wherein the other system performs a directional determination comprising weighting the average signal response of at least some of the two or more antennas in the antenna array and estimating a signal direction based on the weighting.

9. A non-transitory computer readable medium encoded with a computer program product containing a computer executable program code, wherein the computer executable program code comprises:
code configured to activate a signal measurement operation in an apparatus;
code configured to measure signal response in an antenna system comprising two or more antennas, wherein the signal response is measured in accordance with a pattern;
code configured to, after completing at least one measurement of the antenna system, alter the pattern;
code configured to measure signal response in the antenna system in accordance with the altered pattern;
code configured to average the signal response measured for the antenna system in the pattern with the signal response measured for the antenna system in the altered pattern; and
code configured to provide the results of the averaging to another system in the apparatus.

10. The non-transitory computer readable medium of claim 9, wherein measuring the signal response in the antenna system comprises measuring the signal response in some or all of the two or more antennas in an order defined by the pattern.

11. The non-transitory computer readable medium of claim 10, wherein measuring some or all of the two or more antennas is performed by a receiver in the apparatus configured in accordance with the pattern.

12. The non-transitory computer readable medium of claim 9, wherein the pattern depends upon at least one of the strength of the measured signal response, the number of antennas or environmental conditions.

13. The non-transitory computer readable medium of claim 9, wherein the pattern comprises at least one of all of the two or more antennas being ordered sequentially, or some or all of the two or more antennas being ordered in at least one sequence of looping subsets.

14. The non-transitory computer readable medium of claim 9, wherein altering the pattern comprises reversing the order in which signal response is measured in some or all of the two or more antennas.

15. The non-transitory computer readable medium of claim 9, wherein averaging the signal response comprises averaging the antenna response measured for each of the two or more antennas measured in the pattern with the signal response measured for the same antenna in the altered pattern.

16. The non-transitory computer readable medium of claim 9, wherein the other system performs a directional determination comprising weighting the average signal response of at least some of the two or more antennas in the antenna array and estimating a signal direction based on the weighting.

17. An apparatus, comprising:
a processor, the processor being configured to:
activate a signal measurement operation;
measure signal response in an antenna system comprising two or more antennas, wherein the signal response is measured in accordance with a pattern;
after completing at least one measurement of the antenna system, alter the pattern;
measure signal response in the antenna system in accordance with the altered pattern;
average the signal response measured for the antenna system in the pattern with the signal response measured for the antenna system in the altered pattern; and
provide the results of the averaging to another system in the apparatus.

18. The apparatus of claim 17, wherein measuring the signal response in the antenna system comprises measuring the signal response in some or all of the two or more antennas in an order defined by the pattern.

19. The apparatus of claim 18, wherein measuring some or all of the two or more antennas is performed by a receiver in the apparatus configured in accordance with the pattern.

20. The apparatus of claim 17, wherein the pattern depends upon at least one of the strength of the measured signal response, the number of antennas or environmental conditions.

21. The apparatus of claim 17, wherein the pattern comprises at least one of all of the two or more antennas being ordered sequentially, or some or all of the two or more antennas being ordered in at least one sequence of looping subsets.

22. The apparatus of claim 17, wherein altering the pattern comprises reversing the order in which signal response is measured in some or all of the two or more antennas.

23. The apparatus of claim 17, wherein averaging the signal response comprises averaging the antenna response measured for each of the two or more antennas measured in the pattern with the signal response measured for the same antenna in the altered pattern.

24. The apparatus of claim 17, wherein the other system performs a directional determination comprising weighting the average signal response of at least some of the two or more antennas in the antenna array and estimating a signal direction based on the weighting.

25. An apparatus, comprising:
means for activating a signal measurement operation in the apparatus;
means for measuring signal response in an antenna system comprising two or more antennas, wherein the signal response is measured in accordance with a pattern;
means for, after completing at least one measurement of the antenna system, altering the pattern;

means for measuring signal response in the antenna system in accordance with the altered pattern;
means for averaging the signal response measured for the antenna system in the pattern with the signal response measured for the antenna system in the altered pattern; and
means for providing the results of the averaging to another system in the apparatus.

26. A system, comprising:
an apparatus; and
a signal source;
the apparatus activating a signal measurement operation that measures the response in an antenna system comprising two or more antennas to a signal emitted by the signal source, wherein the signal response is measured in accordance with a pattern;
after completing at least one measurement of the antenna system, the apparatus further altering the pattern and measuring the response in the antenna system to the signal emitted by the signal source in accordance with the altered pattern; and
the apparatus further averaging the signal response measured for the antenna system in the pattern with the signal response measured for the antenna system in the altered pattern and determining the direction of the signal source based on the average.

* * * * *